United States Patent
Izzo et al.

(10) Patent No.: US 9,664,161 B2
(45) Date of Patent: May 30, 2017

(54) VALVE ASSEMBLY FOR AN INJECTION VALVE AND INJECTION VALVE

(71) Applicant: CONTINENTAL AUTOMOTIVE GMBH, Hannover (DE)

(72) Inventors: Ivano Izzo, Pisa (IT); Mose Gado, Nave (IT); Matteo Soriani, Leghorn (IT)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 198 days.

(21) Appl. No.: 14/354,817

(22) PCT Filed: Oct. 24, 2012

(86) PCT No.: PCT/EP2012/071036
§ 371 (c)(1),
(2) Date: Apr. 28, 2014

(87) PCT Pub. No.: WO2013/060717
PCT Pub. Date: May 2, 2013

(65) Prior Publication Data
US 2015/0041568 A1 Feb. 12, 2015

(30) Foreign Application Priority Data
Oct. 26, 2011 (EP) .................................... 11186660

(51) Int. Cl.
*F02M 51/06* (2006.01)
*F02M 61/12* (2006.01)
(Continued)

(52) U.S. Cl.
CPC .... *F02M 51/0625* (2013.01); *F02M 51/0685* (2013.01); *F02M 61/12* (2013.01);
(Continued)

(58) Field of Classification Search
CPC ............. F02M 51/0685; F02M 51/066; F02M 51/0625; F02M 63/0075; F02M 51/0675;
(Continued)

(56) References Cited

U.S. PATENT DOCUMENTS

| 4,984,549 A * | 1/1991 | Mesenich .......... F02M 51/0625 123/472 |
| 6,450,424 B1 * | 9/2002 | Horbelt .............. F02M 51/0625 239/583 |
| 2012/0318885 A1 * | 12/2012 | Grandi ................. F02M 51/066 239/5 |

FOREIGN PATENT DOCUMENTS

| DE | 102004056424 A1 | 5/2006 | ............. F02M 51/06 |
| DE | 102005052252 A1 | 5/2007 | ............. F02M 51/00 |

(Continued)

OTHER PUBLICATIONS

European Search Report, Application No. 11186660.4, 5 pages, Mar. 20, 2012.

(Continued)

*Primary Examiner* — Arthur O Hall
*Assistant Examiner* — Juan C Barrera
(74) *Attorney, Agent, or Firm* — Slayden Grubert Beard PLLC

(57) ABSTRACT

An injection valve assembly includes a valve body having a cavity with a fluid inlet and a fluid outlet, a valve needle axially movable in the cavity to control fluid flow through the fluid outlet, an electro-magnetic actuator unit having an armature axially movable in the cavity and having a main body and a flange axially distanced from and fixedly coupled to the main body, and a stop element fixed to the valve needle and arranged in the cavity between the main body and the flange. An armature spring in the cavity forces the stop element into contact with an inner surface of the flange. An overlapping area of the stop element and the inner surface is (Continued)

bounded by an inner contour and an outer contour, and an area enclosed by the outer contour is at least three times as large as an area enclosed by the inner contour.

20 Claims, 5 Drawing Sheets

(51) Int. Cl.
    *F02M 63/00* (2006.01)
    *F16K 31/06* (2006.01)

(52) U.S. Cl.
    CPC ..... *F02M 63/0075* (2013.01); *F16K 31/0658* (2013.01); *F02M 51/0675* (2013.01); *F02M 2200/306* (2013.01)

(58) Field of Classification Search
    CPC ......... F02M 51/0628; F02M 2200/306; F02M 2200/308; F02M 61/20; F16K 31/0658
    USPC ........................................... 239/585.1, 858.5
    See application file for complete search history.

(56) References Cited

FOREIGN PATENT DOCUMENTS

| EP | 1460263 A1 | 9/2004 | ............. F02M 51/06 |
| WO | 2013/060717 A1 | 5/2013 | ............. F02M 51/06 |

OTHER PUBLICATIONS

International Search Report and Written Opinion, Application No. PCT/EP2012/071036, 9 pages, Dec. 18, 2012.

\* cited by examiner

VALVE ASSEMBLY FOR AN INJECTION VALVE AND INJECTION VALVE

CROSS-REFERENCE TO RELATED APPLICATIONS

This application is a U.S. National Stage Application of International Application No. PCT/EP2012/071036 filed Oct. 24, 2012, which designates the United States of America, and claims priority to EP Application No. 11186660.4 filed Oct. 26, 2011, the contents of which are hereby incorporated by reference in their entirety.

TECHNICAL FIELD

The present disclosure relates to a valve assembly for an injection valve and an injection valve for a combustion chamber of a combustion engine.

BACKGROUND

Injection valves are in widespread use, in particular for internal combustion engines where they may be arranged in order to dose fluid into an intake manifold of the internal combustion engine or directly into the combustion chamber of a cylinder of the internal combustion engine.

Injection valves are manufactured in various forms in order to satisfy the various needs for the various combustion engines. Therefore, for example, their length, their diameter, and also various elements of the injection valve being responsible for the way the fluid is dosed may vary in a wide range. In addition to that, injection valves may accommodate an actuator for actuating a needle of the injection valve, which may, for example, be an electromagnetic actuator or a piezoelectric actuator.

In order to enhance the combustion process in view of the creation of unwanted emissions, the respective injection valve may be suited to dose fluids under very high pressures. The pressures may be in the case of a gasoline engine in the range of up to 500 bar and in the case of a diesel engine in the range of more than 2 000 bar, for example.

SUMMARY

One embodiment provides a valve assembly for an injection valve, comprising a valve body comprising a central longitudinal axis and a cavity with a fluid inlet portion and a fluid outlet portion, a valve needle axially movable in the cavity, the valve needle preventing a fluid flow through the fluid outlet portion in a closing position and releasing the fluid flow through the fluid outlet portion in further positions, an electro-magnetic actuator unit provided for actuating the valve needle, the actuator unit comprising an armature, the armature being axially movable in the cavity and comprising a main body and a flange being axially distanced from the main body, the flange being fixedly coupled to the main body and having an inner surface facing the main body, and a stop element being fixedly coupled to the valve needle and being arranged in the cavity axially between the main body and the flange of the armature, and an armature spring being arranged in the cavity axially between the main body and the flange, and the armature spring being operable to provide a force acting on the stop element to bring the stop element in contact with the inner surface of the flange, wherein an overlapping area of the stop element and the inner surface is bounded by an inner contour and an outer contour and an area content enclosed by the outer contour is at least three times as large as an area content enclosed by the inner contour.

In a further embodiment, the following holds true for a ratio of the area content Ao enclosed by the outer contour and the area content Ai enclosed by the inner contour: $3 \leq Ao/Ai \leq 7$.

In a further embodiment, the overlapping area has a ring-shape having an inner diameter Ri and an outer diameter Ro, and the following holds true for a ratio of the outer diameter Ro and the inner diameter Ri: $1.5 \leq Ro/Ri \leq 3$.

In a further embodiment, the armature, the stop element and the valve needle are shaped in such fashion that the main body is inoperable to transfer an axially directed force to the valve needle by direct mechanical interaction with the valve needle or the stop element.

In a further embodiment, an upper guide element is arranged in the cavity and is fixedly coupled to the valve body, the upper guide element being designed to guide the armature inside the cavity.

In a further embodiment, the main body has a central opening and the upper guide element is received in the central opening.

In a further embodiment, an upper guide element is arranged in the cavity and is fixedly coupled to the valve needle, the upper guide element being designed to form a guide element for the valve needle relative to the armature.

In a further embodiment, the main body has a central opening and the upper guide element is arranged in the central opening so that it projects from the central opening on a side facing the fluid inlet portion.

In a further embodiment, the stop element is in one piece with the upper guide element.

In a further embodiment, the upper guide element comprises a recess, the valve needle is partially arranged in the recess and the valve needle is form-fit coupled to the upper guide element.

In a further embodiment, the inner surface of the flange is planar, and the stop element comprises a planar surface facing the planar inner surface of the flange, and the planar surface of the stop element and the planar inner surface of the flange being designed to be in contact with each other.

In a further embodiment, a cylindrical guide element is fixedly coupled to the stop element, the cylindrical guide element extending in axial direction and being designed to guide the valve needle relative to the armature.

In a further embodiment, the flange of the armature comprises a cylindrical section extending in axial direction and being designed to form a guide element for the valve needle relative to the armature.

In a further embodiment, the stop element is in one piece with the valve needle.

Another embodiment provides an injection valve for a combustion chamber of a combustion engine comprising a valve assembly with any of the features disclosed above.

BRIEF DESCRIPTION OF THE DRAWINGS

Example embodiments of the valve assembly and of the injection valve are disclosed below with reference to the drawings, in which.

DETAILED DESCRIPTION

Figure 1A:
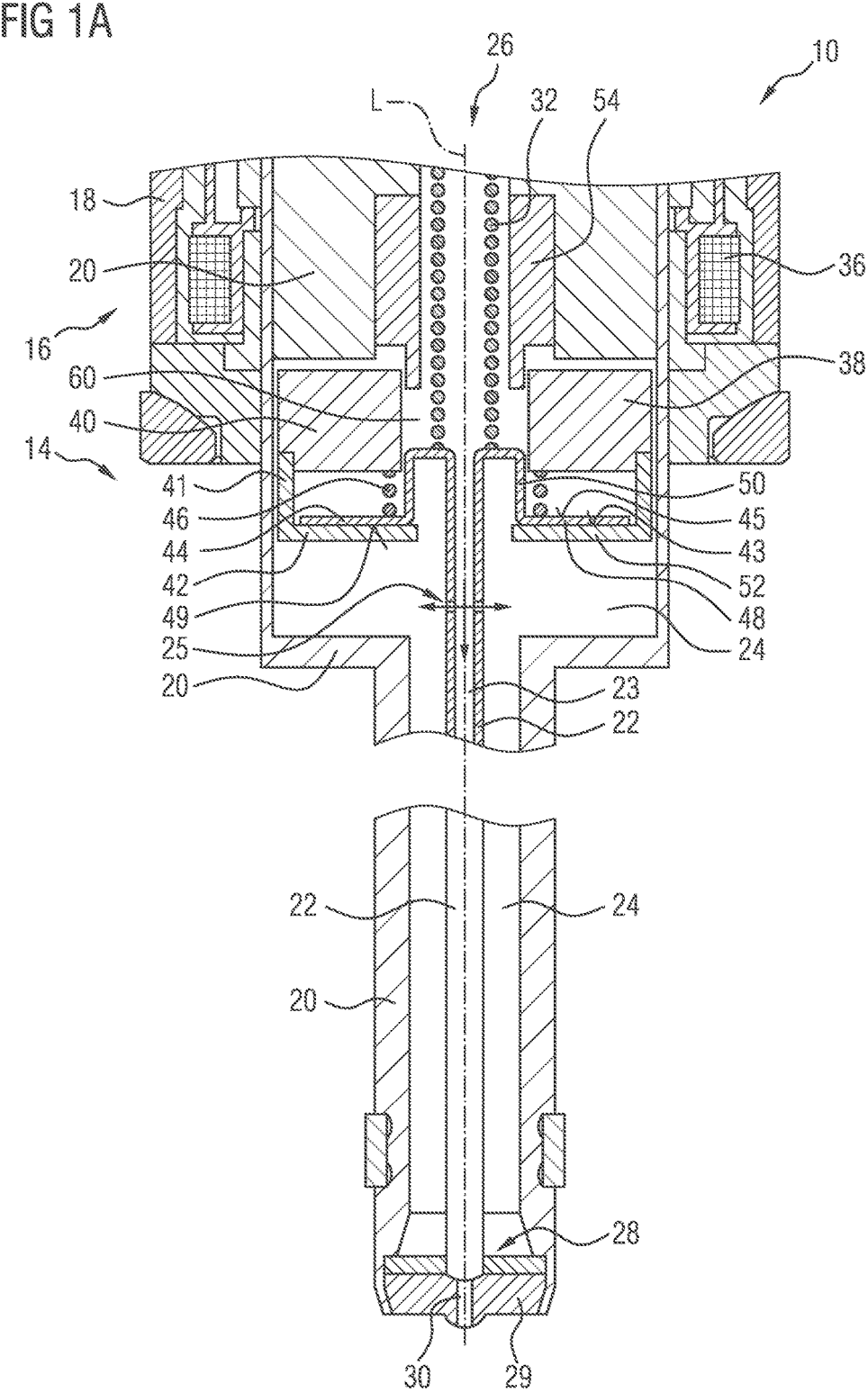
FIG. 1A shows an injection valve in a longitudinal section view with a valve assembly in a first embodiment.

Embodiments of the present invention provide a valve assembly which may be manufactured in a simple way and/or which facilitates a reliable and precise function.

According to a first aspect, a valve assembly for an injection valve is specified. The valve assembly comprises a valve body having a central longitudinal axis and a cavity with a fluid inlet portion and a fluid outlet portion. It further comprises a valve needle which is axially movable in the cavity, the valve needle preventing a fluid flow through the fluid outlet portion in a closing position and releasing the fluid flow through the fluid outlet portion in further positions.

In one embodiment, the valve assembly comprises a main spring which is operable to bias the valve needle towards the closing position. For example, the main spring exerts a force on the valve needle to press the valve needle—in particular a tip of the valve needle—against the valve body when the valve needle is in the closing position, in particular for retaining the valve assembly in a closed configuration.

The valve assembly comprises an electro-magnetic actuator unit which is designed to actuate the valve needle. In particular, the actuator unit is operable to move the valve needle away from the closing position, in particular against the force of the main spring. The actuator unit comprises an armature. The armature is axially movable in the cavity. The armature comprises a main body and a flange which is axially distanced from the main body. The flange is fixedly coupled to the main body and has an inner surface facing the main body.

The valve assembly comprises a stop element being fixedly coupled to the valve needle. The stop element is arranged in the cavity axially between the main body and the flange of the armature.

An armature spring is arranged in the cavity axially between the main body and the flange. The armature spring is designed to provide a force acting on the stop element to bring the stop element in contact with the inner surface of the flange.

For example, the armature spring is arranged between the main body and a bearing surface of the stop element. In particular, one axial end of the armature spring bears on the main body and the opposite axial end of the armature bears on the bearing surface of the stop element. The armature spring is preferably pre-loaded so that it is operable to press the stop element against the inner surface of the flange.

The dynamics of the movement of the valve needle may be very good for the present valve assembly. In particular, due to the arrangement of the armature spring, the stop element and the flange an overshoot of the movement of the valve needle may be avoided during the valve needle moves into its closing position or during the valve needle moves out of its closing position. Consequently, the amount of injected fluid may be controlled in a very precise manner. Furthermore, the valve assembly may be manufactured in a very simple manner. In particular, the number of press fitting and welding steps may be kept small. Consequently, the manufacturing costs of the valve assembly may be kept small.

In one embodiment, an overlapping area of the stop element and the inner surface of the flange is bounded by an inner contour facing the central longitudinal axis and an outer contour remote from the central longitudinal axis. The overlapping area is in particular that portion of the inner surface of the flange which is covered by the stop element in top view along the central longitudinal axis.

The flange may have an opening through which the valve needle extends. For example in this case, the inner contour may correspond to an edge of a side-face of the opening. The edge is expediently that edge of the side-face which faces the stop element. The side-face may have an annular shape. The outer contour of the overlapping area may be congruent to an outer contour of the stop element in top view along the central longitudinal axis.

The area content enclosed by the outer contour preferably has a value which is at least three times the value of the area content enclosed by the inner contour. In one development, the area content enclosed by the outer contour is ten times or less the area content enclosed by the inner contour. For example, the following holds true for a ratio of the area content Ao enclosed by the outer contour and the area content Ai enclosed by the inner contour: $3 \leq Ao/Ai \leq 7$, in particular $3.24 \leq Ao/Ai \leq 6.25$. The area content of the overlapping area is preferably the difference of the area content enclosed by the outer contour and the area content enclosed by the inner contour.

In one embodiment, the overlapping area has a ring-shape having an inner diameter Ri and an outer diameter Ro, wherein $1.5 \leq Ro/Ri \leq 3$, in particular $1.8 \leq Ro/Ri \leq 2.5$. For example the inner diameter has a value between 3 mm and 6 mm, preferably between 4 mm and 5 mm, wherein the limits are included in each case. The outer diameter may have a value between 8 mm and 12 mm, preferably between 9 mm and 10 mm, wherein the limits are included in each case.

In one embodiment the inner surface of the flange is planar, and the stop element comprises a planar surface facing the planar inner surface of the flange. The planar surface of the stop element and the planar inner surface of the flange are designed to be in contact with each other. The contacting portions of the planar surface of the stop element and the planar inner surface of the flange in particular represent the overlapping area.

One advantage of such an overlapping area is that fluid which is located in a gap between the planar surface of the stop element and the planar inner surface of the flange enables a damping of the relative movement between the stop element and the flange in the case that the stop element and the flange move towards each other. Consequently, the movement of the valve needle relative to the armature may be dampened during the valve needle moves into its closing position. Therefore, during this movement of the valve needle an unwanted additional movement of the valve needle due to bouncing may be avoided and a very good closing characteristic of the valve needle can be obtained.

A further advantage is that due to fluid being located in the gap between the planar surface of the stop element and the planar inner surface of the flange a sticking effect between the stop element and the flange may occur in the case that the stop element and the flange move away from each other. For example, fluid is moving into the gap between the stop element and the inner surface of the flange in the region of the overlapping area when the stop element and the flange move away from each other. This fluid movement may result in attractive—in particular hydrodynamic—forces acting against increasing the gap between the stop element and the flange. In this way, energy is dissipated by the movement of the stop element and the flange away from each other. The energy dissipation is particularly efficient due to the comparatively large area content of the overlapping area. Consequently, the relative movement of the valve needle with respect to the armature may be dampened. The large area content of the overlapping area according to the present disclosure may advantageously contribute to a satisfactory damping effect which may not be achievable with a smaller overlapping area. Therefore, an unwanted overshoot of the valve needle when the armature hits the valve body during an opening event of the valve assembly may be largely avoided and a very good opening characteristic of the valve needle can be obtained. In the same way, an unwanted overshoot of the armature when the valve needle hits the valve body during a closing event of the valve assembly may be largely avoided, so that the risk of a so-called armature needle bounce that may lead to an unwanted re-opening of the valve assembly at the end of the closing event is particularly low.

In another embodiment of the valve assembly, the armature, the valve needle, and the stop element are shaped in such fashion that the main body of the armature is inoperable to transfer an axial force to the valve needle by direct mechanical interaction with the valve needle or the stop element. For example, all laterally extending surfaces of the main body are spaced apart from all laterally extending surfaces of the valve needle and of the stop element, preferably throughout the operation of the valve assembly. In other words, axially overlapping portions of the main body of the armature and of the valve needle—or other elements of the valve assembly which are positionally fixed with respect to the valve needle, such as the stop element—do not overlap laterally, i.e. in top view along the central longitudinal axis. Rather, the armature preferably transfers a force to the valve needle for moving the valve needle away from the closing position solely by means of a form-fit connection between the flange of the armature and the stop element.

Positional adjustment of the valve needle with respect to the armature may be particularly simple. Additionally or alternatively, the valve assembly may be particularly insensitive with respect to manufacturing tolerances of the armature and/or the valve needle. Further, the sticking effect described above may be particularly precisely controllable in this way.

In a further embodiment a cylindrical guide element is fixedly coupled to the stop element, the cylindrical guide element extending in axial direction and being designed to guide the valve needle relative to the armature. This has the advantage that a very good guidance of the valve needle relative to the armature may be obtained.

In a further embodiment the flange of the armature comprises a cylindrical section extending in axial direction and being designed to form a guide element for the valve needle relative to the armature. This has the advantage that a very good guidance of the valve needle relative to the armature may be obtained. Furthermore, the flange may be manufactured in a simple manner.

In a further embodiment the stop element is in one piece with the valve needle. This has the advantage that a very solid coupling between the stop element and the valve needle may be obtained. Furthermore, the stop element and the valve needle may be manufactured in a very simple manner.

In a further embodiment an upper guide element is arranged in the cavity, the upper guide element being designed to guide the armature inside the cavity. For example, the main body of the armature has a central axial opening and the upper guide element is received in the central axial opening. The central axial opening expediently extends completely through the main body in axial direction. In one development, at least one of the following parts extends into or through the central axial opening: the valve needle, the stop element, the main spring. In this case, the upper guide element is preferably shaped as a sleeve and at least the valve needle and/or the stop element and/or the main spring extend(s) into or through the upper guide element. By means of the upper guide element, a particularly high repetition rate and/or a particularly small minimum fluid flow may be achievable.

The upper guide element may be fixedly coupled to the valve body for example by press-fitting. The upper guide element being fixedly coupled—i.e. positionally fix—to the valve body may advantageously represent a particularly precise guide for the armature. A press-fit coupling may advantageously allow very simple manufacturing of the valve assembly.

In a further embodiment an upper guide element is arranged in the cavity and is fixedly coupled to the valve needle, the upper guide element being designed to form a guide element for the valve needle relative to the armature. This has the advantage that the upper guide element may carry out different functions, for example the guiding of the valve needle relative to the armature and the guiding of the valve needle relative to the valve body.

Furthermore, the upper guide element may be coupled to the valve needle in a very simple manner, for example by press-fitting.

In one development, the upper guide element which is fixedly coupled to the valve needle is arranged in the central axial opening of the main body of the armature and have a projecting portion which axially projects from the central axial opening on a side facing the fluid inlet portion of the valve body.

The projecting portion of the upper guide element may be received in a guiding portion of the cavity of the valve body, the guiding portion being dimensioned for guiding the upper guide element in axial direction. In particular, the projecting portion of the upper guide element and the guiding portion of the valve body have basically the same shape and size.

The upper guide element in this development and in other embodiments may have a larger lateral cross-sectional area than a portion of the valve needle downstream of the armature. Such an upper guide element may, with advantage, be operable to guide the valve needle with respect to the housing and also contribute to axially guiding the armature.

In a further embodiment the stop element is in one piece with the upper guide element. This has the advantage that an assembly of the stop element and the upper guide element may be manufactured in a very simple manner.

In a further embodiment the upper guide element comprises a recess, the valve needle is partially arranged in the recess and the valve needle is form-fit coupled to the upper guide element.

This has the advantage that the valve assembly may be assembled in a very simple manner.

According to a second aspect, an injection valve for a combustion chamber of a combustion engine is specified.

The injection valve comprises the valve assembly according to at least one of the embodiments or developments described above.

According to another aspect, a valve assembly for an injection valve is specified, the valve assembly comprising a valve body comprising a central longitudinal axis and a cavity with a fluid inlet portion and a fluid outlet portion, a valve needle axially movable in the cavity, the valve needle preventing a fluid flow through the fluid outlet portion in a closing position and releasing the fluid flow through the fluid outlet portion in further positions, an electro-magnetic actuator unit provided for actuating the valve needle, the actuator unit comprising an armature, the armature being axially movable in the cavity and comprising a main body and a flange being axially distanced from the main body, the flange being fixedly coupled to the main body and having an inner surface facing the main body, and a stop element being fixedly coupled to the valve needle and being arranged in the cavity axially between the main body and the flange of the armature, and an armature spring being arranged in the cavity axially between the main body and the flange, and the armature spring being operable to provide a force acting on the stop element to bring the stop element in contact with the inner surface of the flange, wherein the armature, the valve needle, and the stop element are shaped in such fashion that the main body of the armature is inoperable to transfer an axial force to the valve needle by direct mechanical interaction with the valve needle or the stop element. The valve assembly may have further features according to at least one of the aspects, embodiments, and developments described above.

According to yet another aspect, a valve assembly for an injection valve is specified, the valve assembly comprising a valve body comprising a central longitudinal axis and a cavity with a fluid inlet portion and a fluid outlet portion, a valve needle axially movable in the cavity, the valve needle preventing a fluid flow through the fluid outlet portion in a closing position and releasing the fluid flow through the fluid outlet portion in further positions, an electro-magnetic actuator unit provided for actuating the valve needle, the actuator unit comprising an armature, the armature being axially movable in the cavity and comprising a main body and a flange being axially distanced from the main body, the flange being fixedly coupled to the main body and having an inner surface facing the main body, and a stop element being fixedly coupled to the valve needle and being arranged in the cavity axially between the main body and the flange of the armature, and an armature spring being arranged in the cavity axially between the main body and the flange, and the armature spring being operable to provide a force acting on the stop element to bring the stop element in contact with the inner surface of the flange. The valve further comprises an upper guide element which is arranged in the cavity, the upper guide element being designed to guide the armature inside the cavity. In one expedient embodiment, the main body of the armature has a central axial opening and the upper guide element is received in the central axial opening. The valve assembly may have further features according to at least one of the aspects, embodiments, and developments described above.

An injection valve 10 (FIG. 1) may be used as a fuel injection valve for a combustion chamber of an internal combustion engine and comprises a valve assembly 14 with an actuator unit 16 which is preferably an electromagnetic actuator unit. The shown injection valve 10 is of an inward opening type. Alternatively, the injection valve 10 may be of an outward opening type.

The valve assembly 14 comprises a housing 18 and a valve body 20. The housing 18 is fixedly coupled to the valve body 20. The valve body 20 has a central longitudinal axis L.

The valve assembly 14 further comprises a valve needle 22. Preferably, the valve needle 22 is hollow and has a recess 23 extending in direction of the central longitudinal axis L.

The valve needle 22 is taken in a cavity 24 of the valve body 20. The cavity 24 is axially led through the valve body 20 and has a fluid inlet portion 26 and a fluid outlet portion 28. The fluid inlet portion 26 is designed to be hydraulically coupled to a high pressure fuel chamber of an internal combustion engine, wherein the fuel is stored under high pressure.

The valve needle 22 has channels 25 which hydraulically couple the recess 23 of the valve needle 22 and the cavity 24 of the valve body 20. The cavity 24, the recess 23 and the channels 25 allow a fluid flow from the fluid inlet portion 26 to the fluid outlet portion 28.

On one of the free ends of the cavity 24 of the valve body 20 the fluid outlet portion 28 is formed which is closed or opened depending on the axial position of the valve needle 22. In a closing position of the valve needle 22 the valve needle 22 sealingly rests on a seat 29 thereby preventing a fluid flow through at least one injection nozzle 30 in the valve body 20. The seat 29 may be made in one part with the valve body 20 or may be separate from the valve body 20.

A main spring 32 is arranged inside the valve body 20. The main spring 32 is mechanically coupled to the valve needle 22. The main spring 32 biases the valve needle 22 towards the closing position. When the valve needle 22 is in the closing position, the main spring 32 exerts a force on the valve needle 22 to press a tip of the valve needle 22 against the seat 29.

The actuator unit 16 comprises a coil 36 and an armature 38. The coil 36 is arranged inside the housing 18. The armature 38 is axially movable in the cavity 24. The housing 18, the coil 36 and the armature 38 are forming an electromagnetic circuit.

The armature 38 has a main body 40, a coupling portion 41 and a flange 42. The coupling portion 41 is extending in axial direction. The flange 42 is axially distanced from main body 40. The flange 42 is fixedly coupled to the main body 40 via the coupling portion 41. Preferably, the coupling portion 41 is in one piece with the flange 42, and the coupling portion 41 is welded to the main body 40. The flange 42 has an inner surface 43 which faces the main body 40. The inner surface 43 of the flange 42 is planar. The flange 42 has a disc-shaped section 52. The disc-shaped section 52 extends in radial direction. The disc-shaped section 52 of the flange 42 comprises the planar inner surface 43.

When the coil 36 is energized, this results in an electromagnetic force acting on the valve needle 22 via the armature 38. The electromagnetic force acts against the mechanical force obtained from the main spring 32. By appropriately energizing the coil 36, the valve needle 22 may in that way be moved away from its closing position which results in a fluid flow through the injection nozzle 30.

Figure 2:
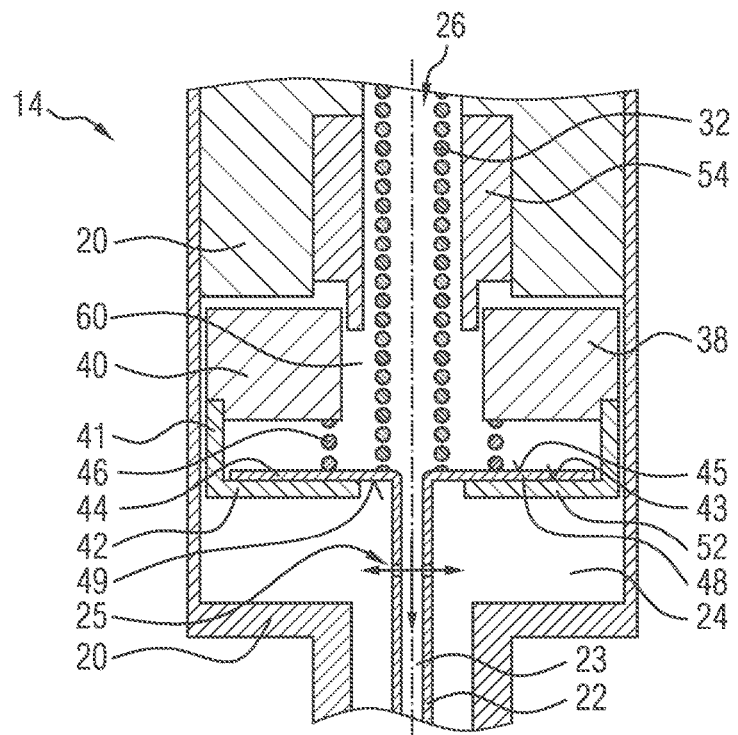
FIG. 2 shows the valve assembly in a further embodiment in a longitudinal section view.
Figure 3:
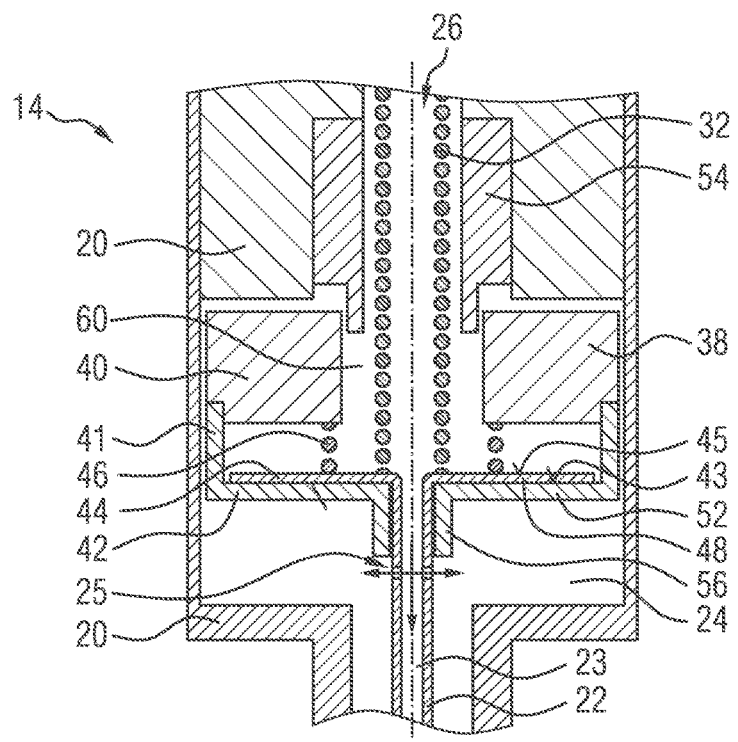
FIG. 3 shows the valve assembly in a further embodiment in a longitudinal section view.
Figure 4:
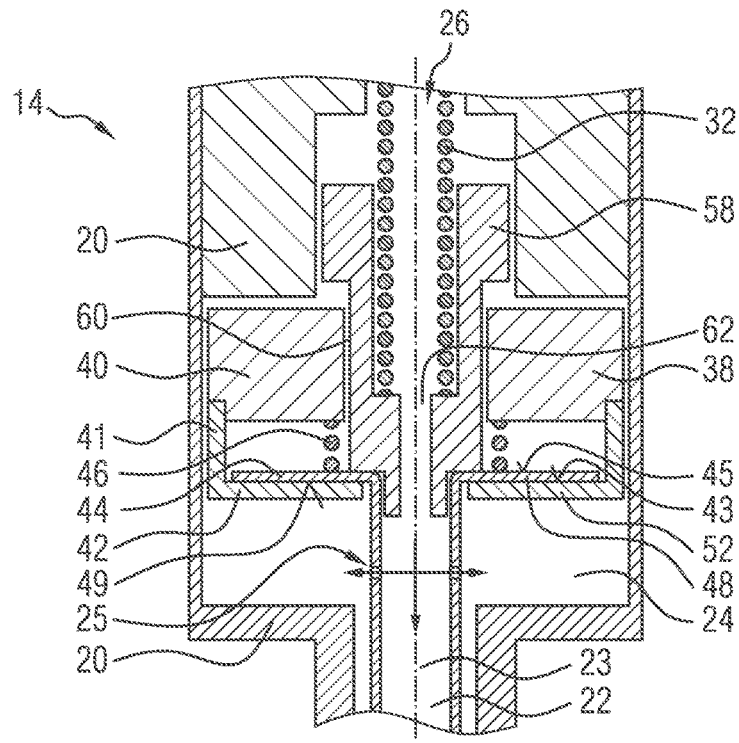
FIG. 4 shows the valve assembly in a further embodiment in a longitudinal section view.

The valve assembly 14 comprises a stop element 44 and an armature spring 46. In the embodiments of FIGS. 1 to 3 the stop element 44 is in one piece with the valve needle 22.

The armature spring 46 is arranged in axial direction between the main body 40 and the flange 42 of the armature 38. Specifically, a first axial end of the armature spring 46 bears on the main body 40 and a second axial end, opposite the first axial end, of the armature spring 46 bears on a bearing surface 45 of the stop element 44.

The armature spring 46 is preloaded to provide a force acting on the stop element 44. This force enables a contact of the stop element 44 with the inner surface 43 of the flange 42. The stop element 44 has a disc-shaped section 48 (FIGS. 1 to 7). The disc-shaped section 48 extends in radial direction away from the valve needle 22. The disc-shaped section 48 has a planar surface 49 facing the planar inner surface 43 of the flange 42. The planar surface 49 of the stop element 44 is pressed against the inner surface 43 of the flange 42 by means of the force generated by the pre-loaded armature spring 46.

Figure 1B:
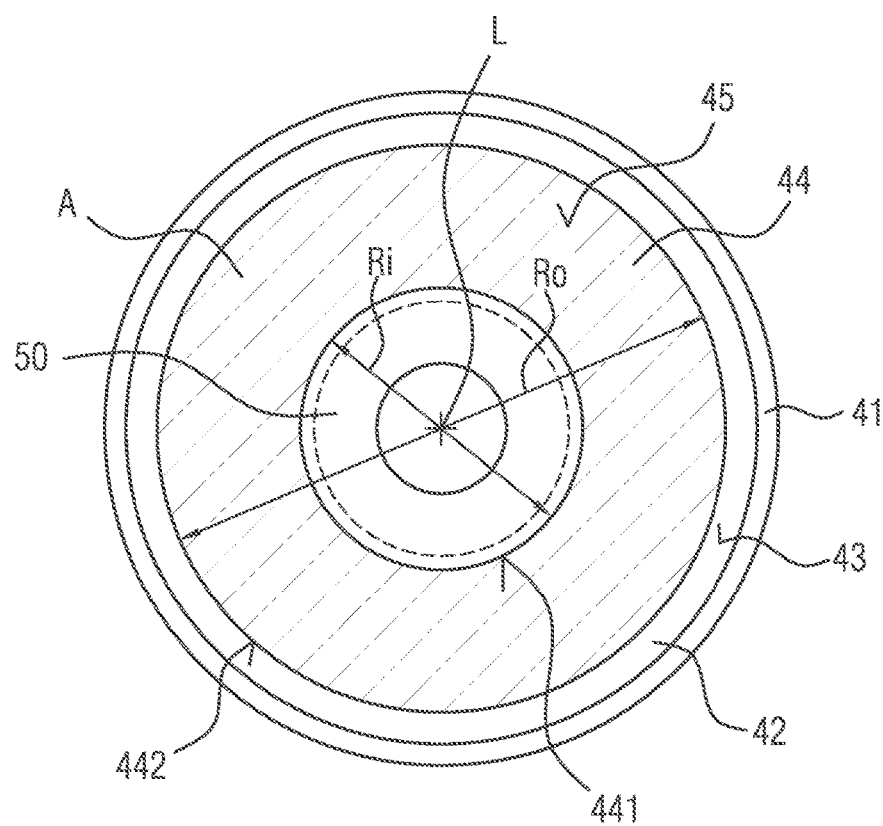
FIG. 1B is a top view of a stop element and a flange of an armature of the valve assembly of FIG. 1A.

FIG. 1B shows a schematic top view along the longitudinal axis L of the flange 42 and the stop element 44.

The flange 42 and the stop element 44 have an overlapping area A which is bounded by an inner contour 441 and an outer contour 442. The overlapping area A is indicated by the hachure with dash-dotted lines in FIG. 1B. It corresponds to the contacting portions of the planar surface 49 of the stop element 44 and of the inner surface 43 of the flange 42.

In the present embodiment, overlapping area A is ring-shaped, the inner contour 441 having an inner diameter Ri and the outer contour having an outer diameter Ro. The outer diameter Ro is twice as large as the inner diameter Ri—for example the outer diameter has a value of 10 mm and the inner diameter has a value of 5 mm—so that a ratio Ro/Ri has a value of 2. The ratio of the corresponding areas Ai and Ao which are enclosed by the inner contour 441 and the outer contour 442, respectively, has a value of $Ao/Ai=Ro^2/Ri^2$, i.e. $Ao/Ai=4$ in the present embodiment.

The embodiment of FIG. 1 shows a cylindrical guide element 50 which is fixedly coupled to the stop element 44. Preferably, the cylindrical guide element 50 is in one piece with the valve needle 22 and the stop element 44. The cylindrical guide element 50 extends in axial direction. The cylindrical guide element 50 enables to guide the valve needle 22 relative to the armature 38.

Preferably, the cylindrical guide element 50 extends axially into a central axial opening 60 of the main body 40 of the armature 38. However, the cylindrical guide element 50 does not overlap laterally with the main body 40. In this way, the armature 38 is in particular inoperable to transfer axial forces to the valve needle 22 by direct mechanical interaction with the cylindrical guide element 50. Since, in addition, the stop element 44 is axially spaced from the main body 40, the armature 38 transfers axially directed forces for moving the valve needle 22 away from the closing position solely via the form-fit connection of the stop element 44 with the flange 42 formed by the planar surface 49 and the planar inner surface 43.

FIGS. 1 to 3 show embodiments of the valve assembly 14 with an upper guide element 54 being arranged in the cavity 24 and being fixedly coupled to the valve body 20, for example by means of a press-fit connection. The upper guide element 54 may guide the armature 38 inside the cavity 24.

Specifically, the upper guide element 54 is received in the central axial opening 60 of the main body 40 of the armature 38. The upper guide element 54 extends into the central axial opening 60 from the side of the fluid inlet portion 26, while the cylindrical guide element 50 extends into the central axial opening 60 from the side of the fluid outlet portion 28. In the present embodiment, the upper guide element 54 is in the form of a sleeve and the main spring 32 extends through the upper guide element 54 into the central axial opening 60 of the main body 40.

FIG. 3 shows an embodiment of the valve assembly 14 wherein the flange 42 comprises a cylindrical section 56 which extends in axial direction. The cylindrical section 56 of the flange 42 forms a guide element for the valve needle 22 with respect to the armature 38.

FIGS. 4 to 7 show embodiments of the valve assembly 14 wherein an upper guide element 58 is arranged in the cavity 24 and is fixedly coupled to the valve needle 22. In particular, the armature 38 has a recess which is in the form of a central axial opening 60 wherein the upper guide element 58 is at least partially arranged. The upper guide element 58 guides the valve needle 22 with respect to the armature 38.

The upper guide element 58 projects from the main body 40 of the armature 38 in a direction towards the fluid inlet portion 26. A guiding portion of the valve body 20 which axially overlaps with the projecting portion of the upper guide element 58 is dimensioned for axially guiding the upper guide element 58 with respect to the valve body 20. The guiding portion of the valve body 20 in particular has basically the inverted shape of the projecting portion of the upper guide element. In this way, the upper guide element 58 contributes to axially guiding the armature 38 by means of mechanical interaction via the central axial opening 60 of the main body 40. An outer diameter of the projecting portion of the upper guide element 58 is larger than an outer diameter of the valve needle 22 in a region downstream of the armature 38, so that the guiding may be particularly precise.

Figure 5:
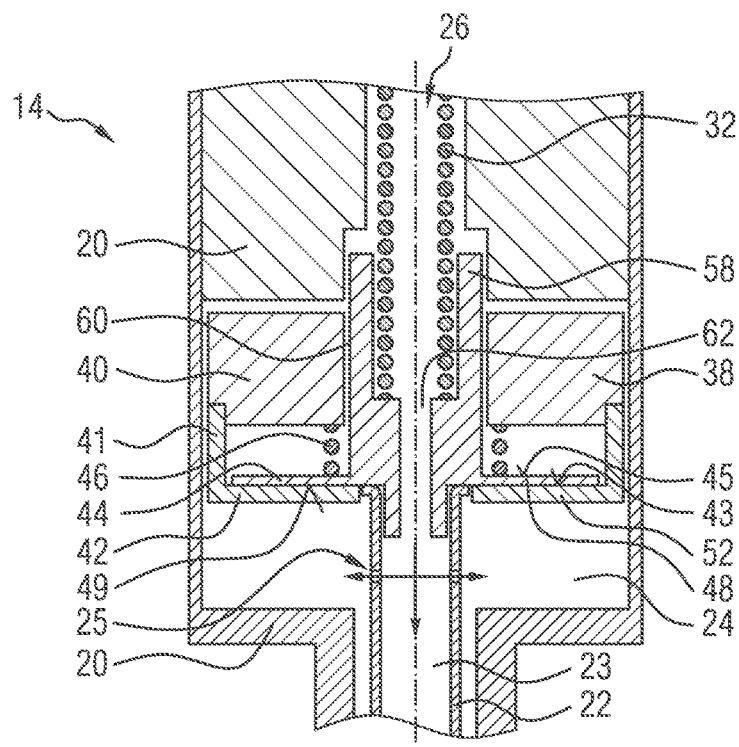
FIG. 5 shows the valve assembly in a further embodiment in a longitudinal section view.
Figure 6:
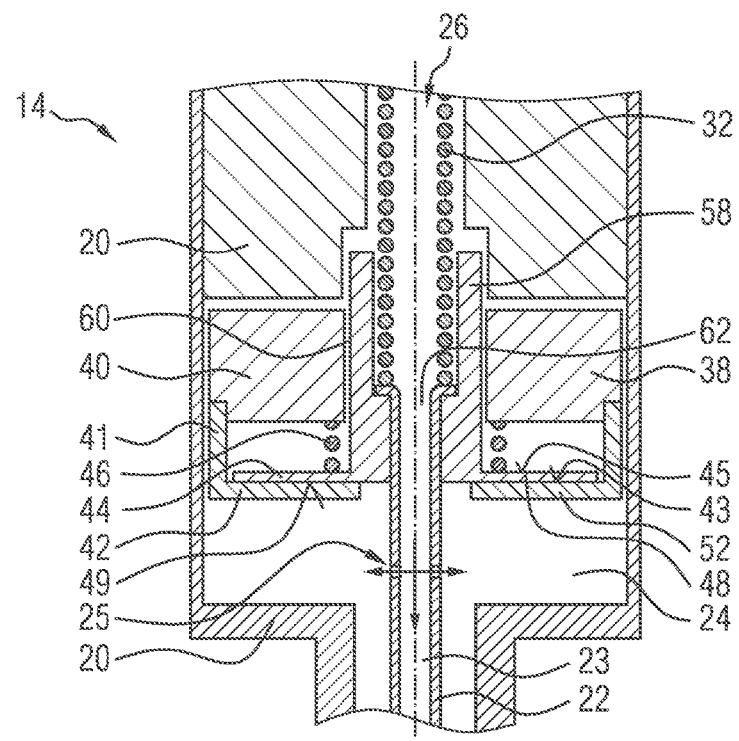
FIG. 6 shows the valve assembly in a further embodiment in a longitudinal section view.
Figure 7:
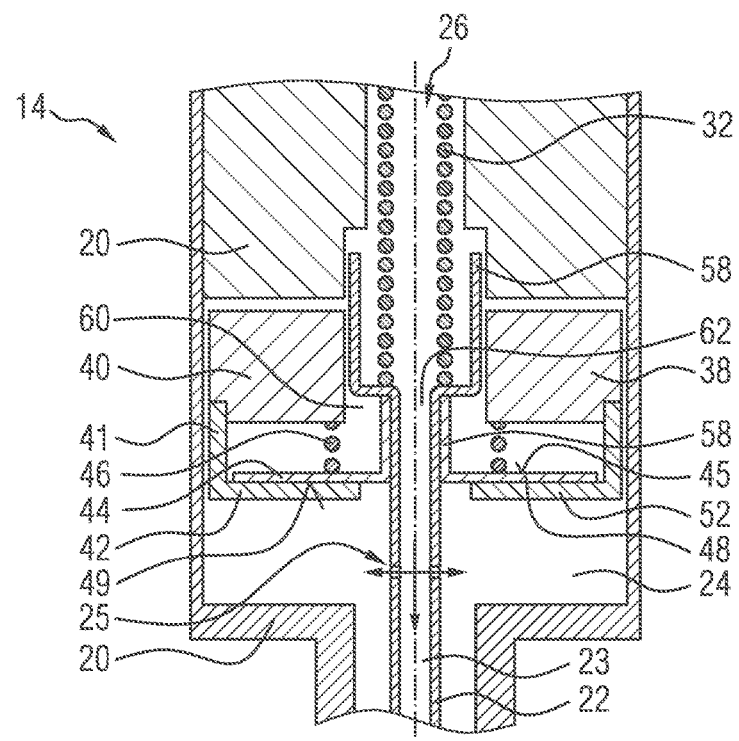
FIG. 7 shows the valve assembly in a further embodiment in a longitudinal section view.

The upper guide element 58 has a recess 62. In the embodiments of FIGS. 4 to 7, the valve needle 22 is partially arranged in the recess 62 of the upper guide element 58 and the valve needle 22 is form-fit coupled to the upper guide element 58. FIGS. 5 to 7 show embodiments of the valve assembly 14 with the stop element 44 being in one piece with the upper guide element 58 which is fixedly coupled to the valve needle 22.

In the following the function of the injection valve 10 is described:

The fluid is led from the fluid inlet portion 26 to the cavity 24 and further to the fluid outlet portion 28. The valve needle 22 prevents a fluid flow through the fluid outlet portion 28 in a closing position of the valve needle 22. Outside of the closing position of the valve needle 22, the valve needle 22 enables the fluid flow through the injection nozzle 30.

In the case when the electro-magnetic actuator unit 16 gets energized the actuator unit 16 may effect an electro-magnetic force on the armature 38. The armature 38 is attracted by the coil 36 and moves in axial direction away from the fluid outlet portion 28. The armature 38 takes the stop element 44 and the valve needle 22 with it by means of the form-fit connection of the planar surface 49 of the stop element 44 with the inner surface 43 of the flange 42, so that the valve needle 22 moves in axial direction out of the closing position. Consequently, fluid may flow through the injection nozzle 30.

The valve assembly 14 reaches its opened configuration when the main body 40 of the armature 38 hits the valve body 20 so that its axial movement towards the fluid inlet portion 26 is stopped. The valve needle 22 may then decouple from the armature 38 and move further in axial direction towards the fluid inlet portion 26, so that the planar surface 49 of the stop element 44 moves out of the form-fit connection with the inner surface 43 of the flange 42, resulting in a gap between these two surfaces.

When the planar surface 49 of the stop element moves away from the inner surface 43 of the flange 42 the gap is increased. The increasing gap, is filled with fluid which is sucked into the gap between the planar surface 49 of the stop element 44 and the planar inner surface 43 of the flange 42 with a comparatively high velocity due to the large overlapping area A. In this way, a sticking effect between the stop element 44 and the flange 42 may be caused, in particular due to hydrodynamic and/or hydrostatic forces resulting from the fluid flowing into the gap. Consequently, the movement of the valve needle 22 relative to the armature 38 may be dampened, and an overshoot of the valve needle 22 may be largely avoided. Therefore, a very good linearity between a pulse width of an electrical signal of a driver which drives the injection valve 10 and an amount of injected fluid may be obtained even if the pulse width is low.

When the valve assembly 14 has stabilized in the opened configuration, the gap between the planar surface 49 of the stop element 44 and the inner surface 43 of the flange 42 is closed again by means of the main spring 32 biasing the valve needle 22 in direction towards the fluid outlet portion 28. When the actuator unit 16 is subsequently de-energized, the main spring 32 can force the valve needle 22 to move in axial direction in its closing position. The valve needle 22 takes the stop element 44 and the armature 38 with it by means of the mechanical coupling between the stop element 44 and the flange 42.

The valve assembly 14 reaches its closed configuration when the valve needle 22 hits the seat 29 so that its axial movement towards the fluid outlet portion 28 is stopped. The armature 38 may then decouple from the valve needle 22 and move further in axial direction towards the fluid outlet portion 28, so that the inner surface 43 of the flange 43 moves out of the form-fit connection with the planar surface 49 of the stop element 44, resulting in a gap between these two surfaces.

In the same way as described above for the opening event, fluid which is sucked into the gap between the planar surface 49 of the stop element 44 and the planar inner surface 43 of the flange 42 of the armature 38 may dampen the relative movement between the stop element 44 and the flange 42. Consequently, the movement of the armature 38 relative to the valve needle 22 may be dampened. Kinetic energy of the armature 38 is efficiently dissipated in this way. Therefore, a bouncing of the valve needle 22 may be avoided when the armature 38 is forced back into form-fit engagement with the stop element 44 by means of the armature spring 46. Therefore, a very good ability to detect the closing position of the valve needle 22 may be obtained.

The invention is not limited to specific embodiments by the description on the basis of said exemplary embodiments but comprises any combination of elements of different embodiments. Moreover, the invention comprises any combination of claims and any combination of features disclosed by the claims.

The invention claimed is:

1. Valve assembly for an injection valve, comprising
a valve body comprising a central longitudinal axis and a cavity with a fluid inlet portion and a fluid outlet portion,
a valve needle axially movable in the cavity, the valve needle preventing a fluid flow through the fluid outlet portion in a closing position and releasing the fluid flow through the fluid outlet portion in further positions,
an electro-magnetic actuator unit configured to actuate the valve needle, the actuator unit comprising an armature, the armature being axially movable in the cavity and comprising a main body and a flange being axially distanced from the main body, the flange being fixedly coupled to the main body and having an inner surface facing the main body, and
a stop element fixedly coupled to the valve needle and arranged in the cavity axially between the main body and the flange of the armature, and
an armature spring arranged in the cavity axially between the main body and the flange, and the armature spring providing a force acting on the stop element to bring the stop element in contact with the inner surface of the flange,
wherein an overlapping area of the stop element and the inner surface is bounded by an inner contour and an outer contour and an area content enclosed by the outer contour is at least three times as large as an area content enclosed by the inner contour.

2. The valve assembly of claim 1, wherein for a ratio of the area content Ao enclosed by the outer contour and the area content Ai enclosed by the inner contour: $3 \le Ao/Ai \le 7$.

3. The valve assembly of claim 1, wherein the overlapping area has a ring-shape having an inner diameter Ri and an outer diameter Ro, and for a ratio of the outer diameter Ro and the inner diameter Ri: $1.5 \le Ro/Ri \le 3$.

4. The valve assembly of claim 1, wherein the armature, the stop element and the valve needle are shaped such that the main body is inoperable to transfer an axially directed force to the valve needle by direct mechanical interaction with the valve needle or the stop element.

5. The valve assembly of claim 1, comprising an upper guide element arranged in the cavity and fixedly coupled to the valve body, the upper guide element configured to guide the armature inside the cavity.

6. Valve assembly of claim 1, comprising an upper guide element arranged in the cavity and fixedly coupled to the valve needle, the upper guide element configured to form a guide element for the valve needle relative to the armature.

7. The valve assembly of claim 6, wherein the main body has a central opening and the upper guide element is arranged in the central opening such that it projects from the central opening on a side facing the fluid inlet portion.

8. The valve assembly of claim 6, wherein the stop element and the upper guide element are formed integrally as one piece.

9. The valve assembly of claim 6, wherein the upper guide element comprises a recess, the valve needle is partially arranged in the recess, and the valve needle is form-fit coupled to the upper guide element.

10. Valve assembly of claim 1, wherein the inner surface of the flange is planar, and the stop element comprises a planar surface facing the planar inner surface of the flange, and wherein the planar surface of the stop element and the planar inner surface of the flange are configured to be in contact with each other.

11. Valve assembly of claim 1, comprising a cylindrical guide element fixedly coupled to the stop element, the cylindrical guide element extending in axial direction and being configured to guide the valve needle relative to the armature.

12. Valve assembly of claim 1, wherein the flange of the armature comprises a cylindrical section extending in axial direction and configured to form a guide element for the valve needle relative to the armature.

13. Valve assembly of claim 1, wherein the stop element and the valve needle are formed integrally as one piece.

14. Valve assembly for an injection valve, comprising
a valve body comprising a central longitudinal axis and a cavity with a fluid inlet portion and a fluid outlet portion,
a valve needle axially movable in the cavity, the valve needle preventing a fluid flow through the fluid outlet portion in a closing position and releasing the fluid flow through the fluid outlet portion in further positions, an electro-magnetic actuator unit configured to actuate the valve needle, the actuator unit comprising an armature, the armature being axially movable in the cavity and comprising a main body and a flange being axially distanced from the main body, the flange being fixedly coupled to the main body and having an inner surface facing the main body, an upper guide element arranged in the cavity and fixedly coupled to the valve body, the upper guide element configured to guide the armature inside the cavity, a stop element fixedly coupled to the valve needle and arranged in the cavity axially between the main body and the flange of the armature, and an armature spring arranged in the cavity axially between the main body and the flange, and the armature spring providing a force acting on the stop element to bring the stop element in contact with the inner surface of the flange, wherein an overlapping area of the stop element and the inner surface is bounded by an inner contour and an outer contour and an area content enclosed by the outer contour is at least three times as large as an area content enclosed by the inner contour, wherein the main body has a central opening and the upper guide element is received in the central opening.

15. An injection valve for a combustion chamber of a combustion engine comprising:

a valve assembly comprising:

a valve body comprising a central longitudinal axis and a cavity with a fluid inlet portion and a fluid outlet portion, a valve needle axially movable in the cavity, the valve needle preventing a fluid flow through the fluid outlet portion in a closing position and releasing the fluid flow through the fluid outlet portion in further positions, an electro-magnetic actuator unit configured to actuate the valve needle, the actuator unit comprising an armature, the armature being axially movable in the cavity and comprising a main body and a flange being axially distanced from the main body, the flange being fixedly coupled to the main body and having an inner surface facing the main body, and a stop element fixedly coupled to the valve needle and arranged in the cavity axially between the main body and the flange of the armature, and an armature spring arranged in the cavity axially between the main body and the flange, and the armature spring providing a force acting on the stop element to bring the stop element in contact with the inner surface of the flange, wherein an overlapping area of the stop element and the inner surface is bounded by an inner contour and an outer contour and an area content enclosed by the outer contour is at least three times as large as an area content enclosed by the inner contour.

16. The injection valve of claim 15, wherein for a ratio of the area content Ao enclosed by the outer contour and the area content Ai enclosed by the inner contour: $3 \leq Ao/Ai \leq 7$.

17. The injection valve of claim 15, wherein the overlapping area has a ring-shape having an inner diameter Ri and an outer diameter Ro, and for a ratio of the outer diameter Ro and the inner diameter Ri: $1.5 \leq Ro/Ri \leq 3$.

18. The injection valve of claim 15, wherein the armature, the stop element and the valve needle are shaped such that the main body is inoperable to transfer an axially directed force to the valve needle by direct mechanical interaction with the valve needle or the stop element.

19. The injection valve of claim 15, wherein the valve assembly comprises an upper guide element arranged in the cavity and fixedly coupled to the valve body, the upper guide element configured to guide the armature inside the cavity.

20. The injection valve of claim 15, wherein the valve assembly comprises an upper guide element arranged in the cavity and fixedly coupled to the valve needle, the upper guide element configured to form a guide element for the valve needle relative to the armature.

* * * * *